United States Patent
Hendrix et al.

(10) Patent No.: US 8,477,248 B2
(45) Date of Patent: Jul. 2, 2013

(54) SYSTEM AND METHOD OF DEMODULATING AUDIO SIGNALS

(75) Inventors: Jon David Hendrix, Wimberly, TX (US); Jeffrey Donald Alderson, Austin, TX (US); Glen Ragan, Austin, TX (US)

(73) Assignee: Sigmatel, Inc., Austin, TX (US)

( * ) Notice: Subject to any disclaimer, the term of this patent is extended or adjusted under 35 U.S.C. 154(b) by 1757 days.

(21) Appl. No.: 11/825,841

(22) Filed: Jul. 9, 2007

(65) Prior Publication Data

US 2009/0015714 A1 Jan. 15, 2009

(51) Int. Cl.
*H04N 5/455* (2006.01)
*H04N 7/52* (2006.01)

(52) U.S. Cl.
USPC ........... 348/726; 348/484; 348/738; 348/475; 348/729; 348/725; 375/324; 455/222

(58) Field of Classification Search
USPC ................. 348/484, 480, 482, 738, 475, 729, 348/725, 726, 462, 724; 375/346, 324; 455/221, 455/226.2, 226.4, 222, 899; 381/71.14, 94.7
See application file for complete search history.

(56) References Cited

U.S. PATENT DOCUMENTS

| | | | |
|---|---|---|---|
| 4,467,360 A | 8/1984 | Fosse | |
| 4,974,087 A | 11/1990 | Rumreich | |
| 5,600,380 A | 2/1997 | Patel et al. | |
| 5,982,457 A | 11/1999 | Limberg | |
| 6,046,781 A | 4/2000 | LeRoy | |
| 6,492,913 B2 | 12/2002 | Vierthaler et al. | |
| 6,535,553 B1 | 3/2003 | Limberg et al. | |
| 7,106,388 B2 * | 9/2006 | Vorenkamp et al. | 348/726 |
| 7,202,910 B1 | 4/2007 | Grubbs et al. | |
| 7,239,357 B2 * | 7/2007 | Jaffe | 348/726 |
| 2001/0055956 A1 | 12/2001 | Konishi et al. | |
| 2003/0199263 A1 | 10/2003 | Oiwa | |
| 2005/0090213 A1 | 4/2005 | Heng et al. | |
| 2005/0181741 A1 * | 8/2005 | Raj et al. | 455/73 |
| 2005/0212977 A1 | 9/2005 | Zhu et al. | |
| 2005/0233712 A1 | 10/2005 | Stefanik et al. | |
| 2006/0001779 A1 | 1/2006 | Favrat et al. | |
| 2006/0055824 A1 | 3/2006 | Zhu et al. | |
| 2006/0210088 A1 | 9/2006 | Lei et al. | |
| 2006/0262934 A1 | 11/2006 | Hustig | |
| 2007/0003070 A1 | 1/2007 | Hayashita | |
| 2007/0091210 A1 | 4/2007 | Alderson | |
| 2008/0144743 A1 * | 6/2008 | Alderson et al. | 375/324 |

OTHER PUBLICATIONS

"STV82x7 Digital Audio Decoder/Processor for A2 and NICAM Television/Video Recorders", Jan. 2006, pp. 1-156, Rev 4.1, ST Microelectronics.
"STV82x8 Digital Audio Decoder/Processor for BTSC Television/Video Recorders", Feb. 2005, pp. 1-157, Rev 1, ST Microelectronics.
"MSP 44xyK, MSP 46xyK Multistandard Sound Processor Family Preliminary Data Sheet", Mar. 8, 2005 Ed., pp. 1-158, Micronas GmbH, Freiburg,Germany.

* cited by examiner

*Primary Examiner* — Jefferey Harold
*Assistant Examiner* — Jean W Desir
(74) *Attorney, Agent, or Firm* — Toler Law Group, P.C.

(57) ABSTRACT

A system and method for demodulating signals are disclosed. In a particular embodiment, the method includes receiving a signal at an input and determining a first noise estimate of the signal. The method also includes providing a first output indicating a second noise estimate of the signal at a primary carrier frequency and providing a second output indicating a third noise estimate of the signal at a secondary carrier frequency.

18 Claims, 6 Drawing Sheets

SYSTEM AND METHOD OF DEMODULATING AUDIO SIGNALS

FIELD OF THE DISCLOSURE

The present disclosure is generally related to systems and methods of demodulating audio signals.

BACKGROUND

Some television (TV) audio demodulator circuits receive a sound intermediate frequency (SIF) signal from a TV tuner circuit and convert the SIF signal into left and right audio signals. In addition, some TV audio demodulator circuits additionally provide a carrier mute functionality where the audio demodulator automatically mutes the audio or forces the audio to be mono in situations where one or both of the TV sound carriers in the SIF signal become too weak. Also, some TV audio demodulator circuits provide an automatic standard detection functionality whereby a signal broadcast using a TV audio standard can be automatically recognized and the appropriate demodulation and decoding circuitry can be engaged according to the detected standard.

However, under problematic broadcast conditions, such as when a broadcaster violates the specified parameters of the local broadcast standard, or under poor reception conditions, such as frequency selective fading, the carrier mute function and the automatic standard detection function can make the wrong decision. When the wrong decision is made, a TV may encounter several problems that may be disruptive to a viewer. First, the audio signals may switch back and forth between sound and silence while the sound is still acceptable. Second, the audio may be distorted due to a deep multipath null in the frequency spectrum. Third, a single over-modulated audio carrier may cause the system to attempt to send stereo signals to the speakers when only a mono signal exists. Hence, there is a need for an improved system and method of demodulating audio signals.

DETAILED DESCRIPTION OF THE DRAWINGS

In a particular embodiment, the method includes receiving a modulated signal at an input and determining a first noise estimate of the modulated signal. The method also includes providing an output indicating a first carrier noise estimate of the modulated signal at a primary carrier frequency and providing an output indicating a second carrier noise estimate of the modulated signal at a secondary carrier frequency. In another particular embodiment, the method also includes providing an output indicating a first carrier noise estimate of the modulated signal.

In another particular embodiment, a method includes sending a first signal to disable an audio output limiting function in an audio demodulator. The method also includes receiving a first indication from the audio demodulator when a first carrier noise estimate is below a threshold. The method further includes receiving a second indication from the audio demodulator of the first carrier noise estimate and limiting the audio output based on the first indication and the second indication.

In yet another particular embodiment, a device includes a radio frequency front end coupled to a first input and adapted to receive a broadcast television signal and apply a gain to the broadcast television signal to produce a modulated signal. The device also includes a demodulator coupled to the radio frequency front end for determining a first carrier noise estimate of the modulated signal. The first carrier noise estimate is determined independent of the gain and independent of an indicator of signal quality of the broadcast television signal at the radio frequency front end.

In another particular embodiment, a method includes sending a first signal to selectively tune a noise mixer to multiple frequencies in a frequency spectrum of a modulated signal. The method also includes receiving an indication of signal energy at each of the multiple frequencies to which the noise mixer is selectively tuned. The method further includes determining an indicator of spectral content of the modulated signal as a function of frequency based on the indication of signal energy, and selectively limiting an output based on the indicator of spectral content.

Figure 1:
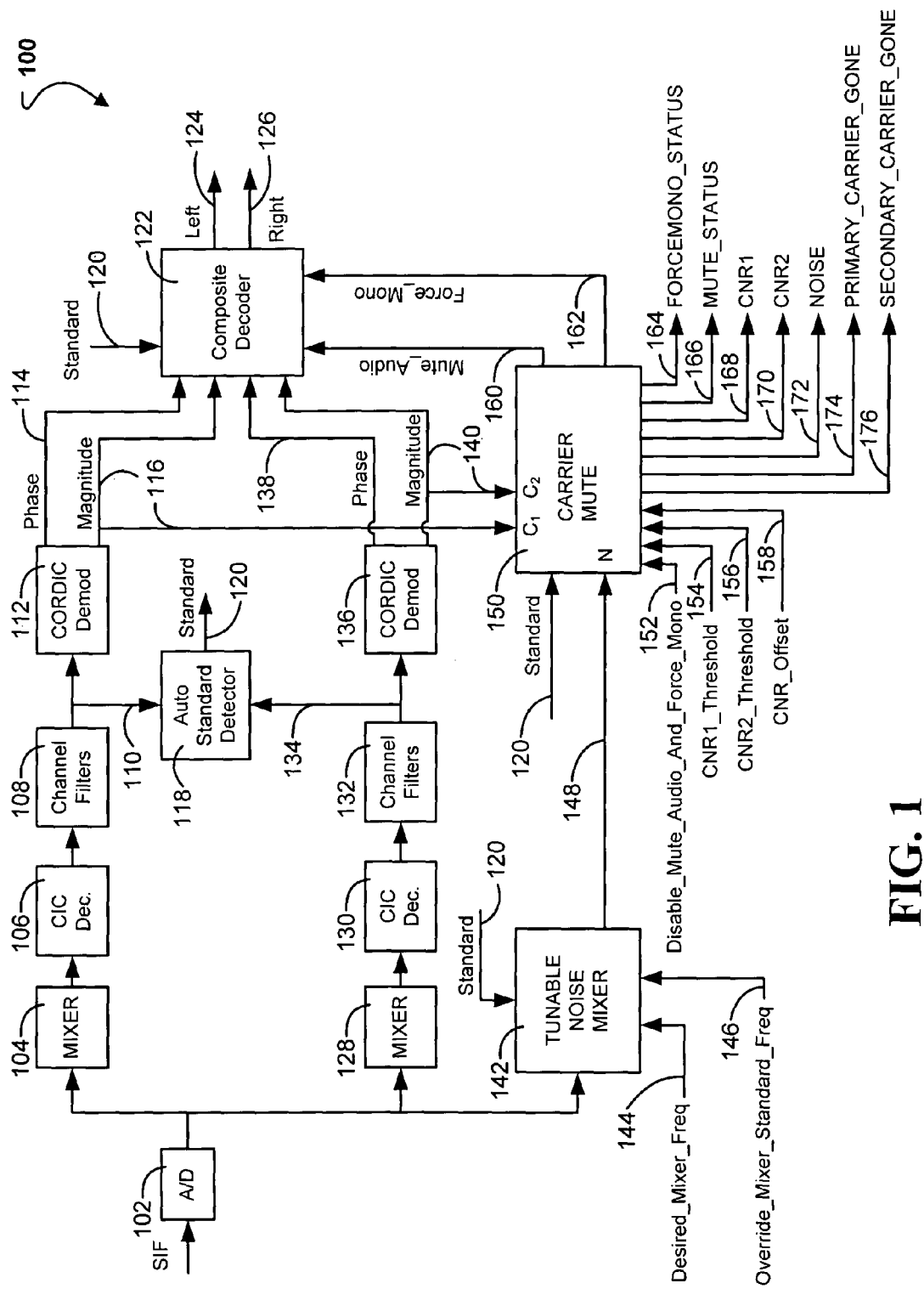
FIG. 1 is a block diagram of a particular illustrative embodiment of a system to demodulate audio signals.

Referring to FIG. 1, a particular illustrative embodiment of a system to demodulate modulated audio signals is depicted and generally designated 100. The system 100 includes an analog-to-digital converter (A/D) 102 coupled to a first mixer 104 and a second mixer 128. The first mixer 104 is coupled to a first cascaded integrator comb (CIC) decimator 106 that is coupled to first channel filters 108. The first channel filters 108 are coupled to an automatic standard detection circuit 118 and a first demodulator 112. The second mixer 128 is coupled to a second CIC decimator 130 that is coupled to second channel filters 132. The second channel filters 132 are coupled to the automatic standard detection circuit 118 and to a second demodulator 136. The first demodulator 112 and the second demodulator 136 may be CORDIC demodulators; that is they can implement a CORDIC algorithm. The first demodulator 112 and the second demodulator 136 are both coupled to a composite decoder 122 that is also coupled to the automatic standard detection circuit 118.

In a particular embodiment, the A/D converter 102 can be coupled to a tunable noise mixer 142. The tunable noise mixer 142 may be coupled to the automatic standard detection circuit 118 and to a carrier mute circuit 150. The carrier mute circuit 150 may also be coupled to the automatic standard detection circuit 118.

During operation, the A/D converter 102 may receive an analog modulated audio signal, convert the analog modulated audio signal to a digital modulated audio signal and provide the digital modulated audio signal to the first mixer 104, the second mixer 128, and the tunable noise mixer 142. The analog modulated audio signal may be a sound intermediate frequency (SIF) signal.

The first mixer 104 may mix to baseband a first carrier frequency of the digital modulated audio signal and provide the digital modulated baseband audio signal to the first CIC decimator 106. The first CIC decimator 106 may downsample the carrier and pass the digital modulated baseband audio signal to the first channel filters 108. The first channel filters 108 may filter the digital modulated baseband audio signal based on the first carrier frequency. The first channel filters 108 may provide a first filtered modulated baseband audio signal 110 to the first demodulator 112 and to the automatic standard detection circuit 118. The first demodulator 112 may determine a phase 114 and a magnitude 116 of the first filtered modulated baseband audio signal 110. The phase 112 and the magnitude 116 may be provided to the composite decoder 122. In a particular embodiment, the magnitude 116 may also be provided to the carrier mute circuit 150.

The second mixer 128 may mix to baseband a second carrier frequency of the digital modulated audio signal and provide the digital modulated baseband audio signal to the second CIC decimator 130. The second CIC decimator 130 may downsample the carrier and pass the digital modulated baseband audio signal to the second channel filters 132. The second channel filters 132 may filter the digital modulated baseband audio signal based on the second carrier frequency. The second channel filters 130 may provide a second filtered modulated baseband audio signal 134 to the second demodulator 136 and to the automatic standard detection circuit 118. The second demodulator 136 may determine a phase 138 and a magnitude 140 of the second filtered modulated baseband audio signal 134. The phase 138 and the magnitude 140 may be provided to the composite decoder 122. In a particular embodiment, the magnitude 140 may also be provided to the carrier mute circuit 150.

The automatic standard detection circuit 118 may receive the first filtered modulated audio signal 110 and the second filtered modulated audio signal 134. The automatic standard detection circuit 118 may determine a broadcast television standard based on the first filtered modulated audio signal 110 and the second filtered audio signal 134. The broadcast TV standard may be determined based on the first carrier frequency and the second carrier frequency. The automatic standard detection circuit 118 may provide a standard signal 120 indicating the detected broadcast TV standard. In a particular embodiment, the standard signal 120 may set at least one bit in a register signifying a specific broadcast television standard. The standard signal 120 may also be provided to the composite decoder 122, the tunable noise mixer 142, and the carrier mute circuit 150.

The composite decoder 122 may provide a left audio signal 124 and a right audio signal 126 based on the phase 114, the magnitude 116, the phase 138, the magnitude 140, and the standard signal 120. The composite decoder 122 can include a mute function to allow muting of the left audio signal 124 and the right audio signal 126. The composite decoder can also include a force mono function to provide a mono audio signal at the left audio signal 124 and the right audio signal 126.

The tunable noise mixer 142 may receive the digital modulated audio signal, the standard signal 120, a desired mixer frequency input 144, and an override mixer standard frequency input 146. The tunable noise mixer 142 may be operable to tune to a tunable frequency where a carrier frequency is not present. Where in the frequency spectrum that a carrier frequency is not present may be determined from the standard signal 120. The tunable frequency may be set to any frequency within the spectrum of the audio signal. This allows the tunable noise mixer to mix to baseband a frequency of interest, giving the subsequent circuitry the ability to estimate energy anywhere in the spectrum. From the tuned frequency, the tunable noise mixer may mix to baseband a portion of the digital modulated audio signal by tuning where there should not be a modulated carrier, according to the detected standard 120.

In a particular embodiment, the tunable frequency may be set via the desired mixer frequency input 144. In yet another particular embodiment, an override bit can be set via the override mixer standard frequency input 146 to ignore a frequency identified by the automatic standard detector 118. An external device, such as a controller, may set the tunable frequency via the desired mixer frequency input 144 and may set the override bit via the override mixer standard frequency input 146.

The tunable noise mixer 142 can mix to baseband a portion of the modulated audio signal spectrum where there is expected to be only noise energy at the tunable frequency as a noise signal 148. The noise signal 148 may be provided to the carrier mute circuit 150. In a particular embodiment, when the tunable noise mixer is tuned to a frequency that is not a carrier frequency, the estimate of the noise energy is a measure of the energy in the audio signal at the tunable frequency. The measure of the energy may be an estimate of the extraneous unwanted signals in the modulated audio signal.

The carrier mute circuit 150 may determine a carrier-to-noise ratio (CNR) for the first carrier frequency and for the second carrier frequency. The carrier mute circuit 150 may also determine when to mute an audio output of the system 100 or force the audio output to be a mono audio signal. The CNR may be a carrier noise estimate that is determined by a carrier signal magnitude plus noise of the carrier signal, all divided by an independent noise estimate of the carrier signal, that is (carrier magnitude+noise)/independent noise estimate. The independent noise estimate may be an estimate of the extraneous unwanted signals in the modulated audio signal.

The carrier mute circuit 150 may receive the noise signal 148, a disable mute audio and force mono input 152, a first CNR threshold 154, a second CNR threshold 156, and a CNR offset 158. Also, the carrier mute circuit 150 can receive the magnitude 116 and the magnitude 140. The disable mute audio and force mono input 152 may allow a system to ignore a decision made by the carrier mute circuit 150 to mute the audio output or force the audio output to be a mono audio signal.

The first CNR threshold 154 may allow a trigger point below which the carrier mute circuit 150 will consider the primary audio carrier as too weak for presentation of audio to the end user. The carrier mute circuit 150 may mute the audio output of the system 100 or force the audio output to be a mono audio signal based on the first CNR threshold 154.

The second CNR threshold 156 may allow a trigger point below which the carrier mute circuit 150 will consider the secondary audio carrier as too weak for presentation of audio to the end user. The carrier mute circuit 150 may mute the audio output of the system 100 or force the audio output to be a mono audio signal based on the second CNR threshold 156.

The CNR offset 158 may allow a system to bias the first CNR threshold 154 and the second CNR threshold 156 to a desirable range. The CNR offset 158 may be set by an external device, such as a controller.

A CNR of the primary audio carrier ($CNR_1$) may be determined by:

$$CNR_1 = C_1 - N + \text{Adjustment};$$

where $C_1$=an estimate of magnitude of the primary carrier signal plus noise;
N=an estimate of noise of the modulated audio signal; and Adjustment=an adjustment factor based on the detected standard.

A CNR of the secondary audio carrier ($CNR_2$) may be determined by:

$$CNR_2 = C_2 - N + \text{Adjustment};$$

where $C_2$=an estimate of magnitude of the secondary carrier signal plus noise;
N=an estimate of noise of the modulated audio signal; and
Adjustment=an adjustment factor based on the detected standard.

In a particular embodiment, $C_1$ may be the magnitude 116 from the first demodulator 112. In another particular embodiment, $C_2$ may be the magnitude 140 from the second demodulator 136.

The carrier mute circuit 150 may provide a mute audio signal 160 to the composite decoder to mute audio outputs 124 and 126. The carrier mute circuit 150 may also provide a force mono signal 162 to the composite decoder 122 to force the outputs 124 and 126 to provide a mono audio signal.

In another particular embodiment, the system 100 may provide status signals from the carrier mute circuit 150. The status signals may be provided to an external device, such as a controller of a TV. The system 100 may allow the external device to monitor and use the status signals.

The status signals may include a force mono status signal 164 that may be an indicator of a decision made by the carrier mute circuit 150 to force the audio outputs to provide a mono audio signal. The status signals may also include a mute status signal 166 that may be an indicator of the decision made by the carrier mute circuit 150 to mute the audio outputs.

The status signals may further include a first CNR signal 168 that may be a CNR estimate for the primary audio carrier. The status signals may further include a second CNR signal 170 that may be a CNR estimate for the secondary audio carrier. The first CNR signal 168 and the second CNR signal 170 may be provided in decibels (dB).

The status signals may also include a noise signal 172 that may be an estimate of the energy at the frequency tuned by the tunable noise mixer 142. The noise signal 172 may be provided in dB. When the carrier mute circuit 150 is actively allowed to mute the audio outputs or force the audio outputs to provide a mono audio signal, when the disable mute audio and force mono signal 152 is not asserted and the override mixer standard frequency 146 is asserted, then the noise signal 172 can be a measure of the noise energy in the modulated audio signal. When the carrier mute circuit 150 is disabled to not allow muting the audio outputs or forcing the audio outputs to provide a mono audio signal, when the disable mute audio and force mono signal 152 is asserted, then the noise signal 172 may be used to indicate the energy at a selected frequency in the audio signal spectrum.

The status signals may also include a primary carrier gone signal 174 that may indicate that the CNR estimate for the primary audio carrier has dropped below the first CNR threshold 154. The status signals may further include a secondary carrier gone signal 176 that may indicate that the CNR estimate for the secondary audio carrier has dropped below the second CNR threshold 156.

Figure 2:
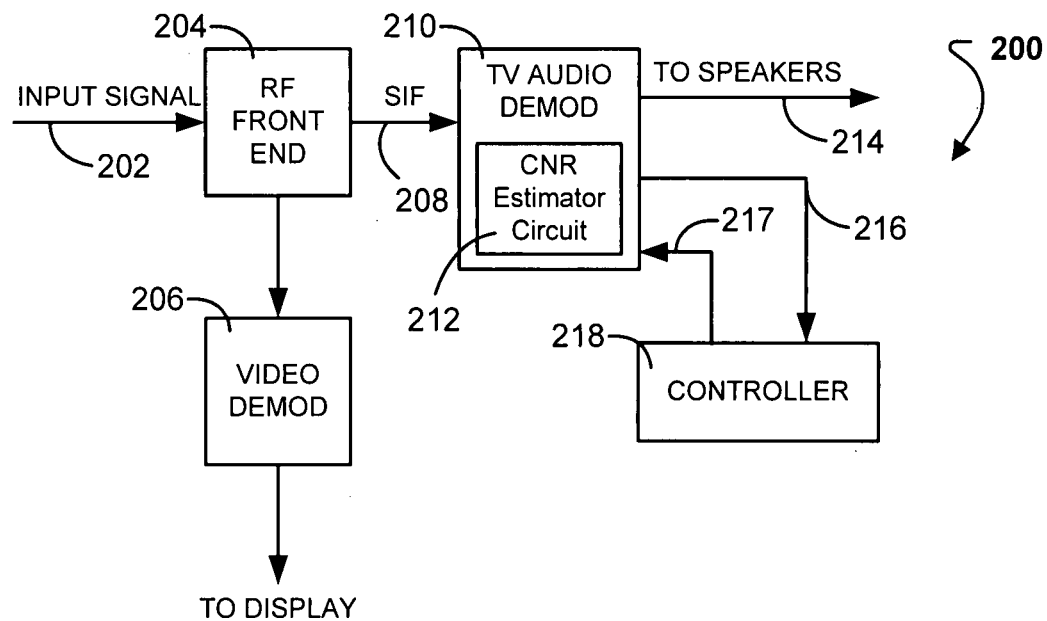
FIG. 2 is a block diagram of a second particular illustrative embodiment of a system to demodulate audio signals.

Referring to FIG. 2, a second particular illustrative embodiment of a system to demodulate audio signals is depicted and generally designated 200. The system 200 includes a radio frequency (RF) front end 204 that may be coupled to a TV audio demodulator 210 that has a CNR estimator circuit 212. The RF front end 204 may also be coupled to a video demodulator 206.

During operation, the RF front end 204 may receive an input signal 202. The input signal 202 may be a broadcast television signal or other audio signal broadcast using a carrier frequency. The RF front end 204 may provide a video portion of the input signal 202 to the video demodulator 206. The video demodulator 206 may provide a demodulated video signal to a display. The RF front end 204 may also provide a modulated audio signal 208 to the TV audio demodulator 210. The audio signal 208 may be an audio portion of the input signal 202. The audio signal 208 may be a SIF signal. The TV audio demodulator 210 may provide a demodulated audio signal 214 to one or more speakers.

In a particular embodiment, the TV audio demodulator 210 may provide an output 216 to a controller 218. The output 216 may comprise one or more output signals or connections. The TV audio demodulator 210 may also receive an input 217 from the controller 218. The input 217 may comprise one or more input signals or connections. The controller 218 may be a controller operable to control TV functionality. The TV audio demodulator 210 may provide a CNR signal to the controller via the output 216. The CNR signal may be an estimate of CNR for a carrier frequency of the audio signal 208 that is determined by the CNR estimator circuit 212.

In a particular embodiment, the output 216 may also include a force mono status signal that may be an indicator of a decision made by the TV audio demodulator 210 to force the demodulated audio signal 214 to be a mono audio signal. The output 216 may also include a mute status signal that may be an indicator of the decision made by the TV audio demodulator 210 to mute the demodulated audio signal 214.

The output 216 may further include a first CNR signal that may be a CNR estimate for a primary audio carrier of the audio signal 208. The output 216 may also include a second CNR signal that may be a CNR estimate for a secondary audio carrier of the audio signal 208. The first CNR signal and the second CNR signal may be provided in decibels (dB). The first CNR signal and the second CNR signal may be determined independent of any signal quality indicators at the RF front end 204 and any gain or automatic gain control (AGC) that the RF front end 204 may apply. In a particular embodiment, the audio demodulator does not use any information regarding gain, AGC, or signal quality from the RF front end 204 to determine the first CNR signal or the second CNR signal.

The output 216 may also include a noise signal that may be an estimate of the energy at a frequency tuned by the TV audio demodulator 210. The noise signal may be provided in dB. The output 216 may further include a primary carrier gone signal that may indicate that the CNR estimate for the primary audio carrier has dropped below a first CNR threshold. The output 216 may further include a secondary carrier gone signal that may indicate that the CNR estimate for the secondary audio carrier has dropped below a second CNR threshold. The noise signal may be determined independent of the signal quality at the RF front end 204 and any gain or automatic gain control (AGC) that the RF front end 204 may apply. In a particular embodiment, the audio demodulator does not use any information regarding gain, AGC, or signal quality from the RF front end 204 to determine the noise signal.

In another particular embodiment, the input 217 may include a tunable frequency signal that may indicate a frequency that the noise signal can be determined from. The input 217 may also include an override signal that can indicate to ignore a frequency identified by the TV Audio demodulator 210. The input 217 may also include a disable mute audio and force mono input signal that may disable the TV audio demodulator 210 from muting the audio output 214 or forcing the audio output 214 to be a mono audio signal.

The input 217 may further include a first CNR threshold signal that may indicate a trigger point below which the TV Audio demodulator 210 may consider the primary audio carrier as too weak. The TV Audio demodulator 210 may mute the audio output 214 or force the audio output 214 to be a mono audio signal based on the first CNR threshold signal. The input 217 may also include a second CNR threshold signal that may indicate a trigger point below which the TV Audio demodulator 210 may consider the secondary audio carrier as too weak. The TV Audio demodulator 210 may mute the audio output 214 or force the audio output 214 to be a mono audio signal based on the second CNR threshold signal.

The input 217 may also include a CNR offset signal that may indicate an offset for the first CNR threshold signal and the second CNR threshold signal. The offset may allow for the first CNR threshold signal and the second CNR threshold signal to be within a desirable range.

In a particular embodiment, the output 216 can be used by the controller 218 to determine if the TV audio demodulator 210 is making correct decisions, such as when to mute the audio output 214 or when to force the audio output 214 to be a mono audio signal. The controller 218 may selectively disable the TV audio demodulator 210 from making decisions. Instead of control by the TV audio demodulator 210, the controller 218 may determine when to mute the audio output 214 or when to force the audio output 214 to be a mono audio signal based on the output 216.

In another particular embodiment, the controller 218 may perform a spectrum sweep. The controller 218 can use the input 217 to disable the mute and force mono capabilities of the TV audio demodulator 210. Then, the controller 218 can use the input 217 to override a pre-programmed noise mixer frequency and force a selected frequency for determining the noise signal. The controller 218 may start at one end of the spectrum and perform iterative operations to determine an estimate of the energy at the selected frequencies across the spectrum. Any frequency within the spectrum may be selected. This method may allow the controller 218 to construct detailed information of what signals exist in the spectrum. This information can be used by the controller 218 to determine any problems with an automatic standard detection function of the TV audio demodulator 210. The information may also be used to determine when the controller 218 should override any muting or forced mono functions of the TV audio demodulator 210. In addition, the information may identify other kinds of broadcast reception problems, which may allow the controller 218 to take action to alleviate effects of such problems.

In a particular embodiment, the TV audio demodulator 210 may include the system 100 depicted in FIG. 1. In another particular embodiment, the TV audio demodulator 210 may be a single integrated circuit. The TV audio demodulator 210 and the controller 218 may be distinct integrated circuits. In yet another particular embodiment, the system 200 may be incorporated in a single housing. The single housing may be a TV, a set-top box, a video playback device, a music player, a computer, or any other device that can receive modulated audio input signals.

Figure 3:
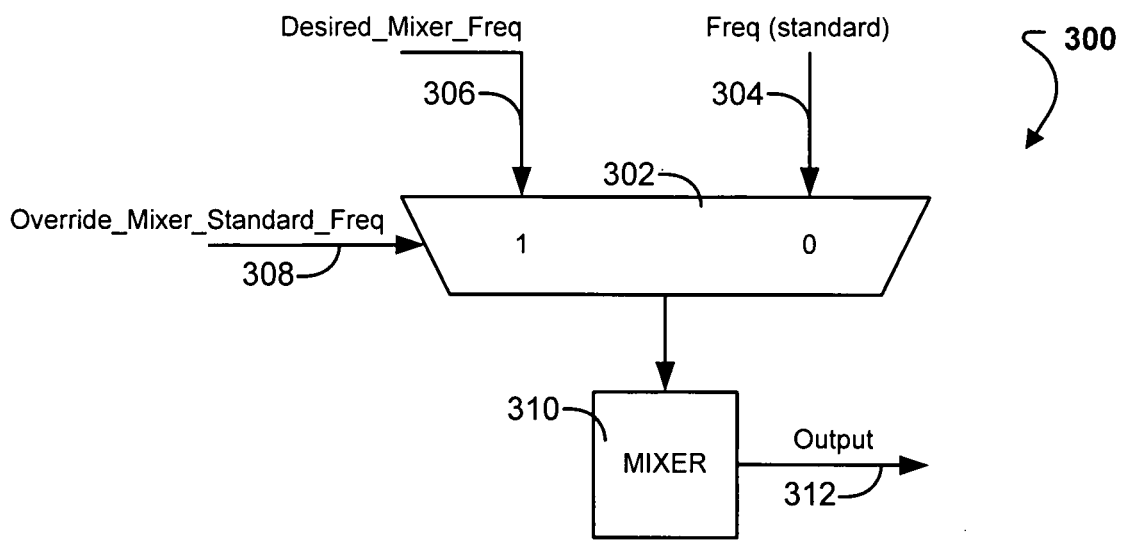
FIG. 3 is a block diagram of a particular illustrative embodiment of a system to selectively tune a mixer.

Referring to FIG. 3, a particular illustrative embodiment of a system to selectively tune a mixer is depicted and generally designated 300. The system 300 includes a multiplexer 302 coupled to a mixer 310. In a particular embodiment, the system 300 comprises the tunable noise mixer 142 shown in FIG. 1.

During operation, the multiplexer 302 can receive a first input 304 and a second input 306. The first input 304 may include a first frequency based on a broadcast standard of an audio signal. The first frequency may be selected based on multiple standards that can be implemented by the system 300. The second input 306 may include a second frequency. The second frequency may be received from an external device, such as the controller 218 shown in FIG. 2. In a particular embodiment, the second input 306 may be received from a standard detection circuit, such as the automatic standard detection circuit 118 shown in FIG. 1. The standard detection circuit may choose the second frequency depending on which standard was detected.

The multiplexer 302 may also receive a control signal 308. The control signal 308 may be an override signal that indicates the multiplexer is to select the second input 306 to be passed to the mixer 310. When the control signal is not asserted, the first input 304 is passed by the multiplexer to the mixer 310. The mixer 310 may detect a magnitude of a signal at the selected frequency and provide the magnitude at the output 312. In a particular embodiment, the output 312 may represent an estimate of noise at the selected frequency.

Figure 4:
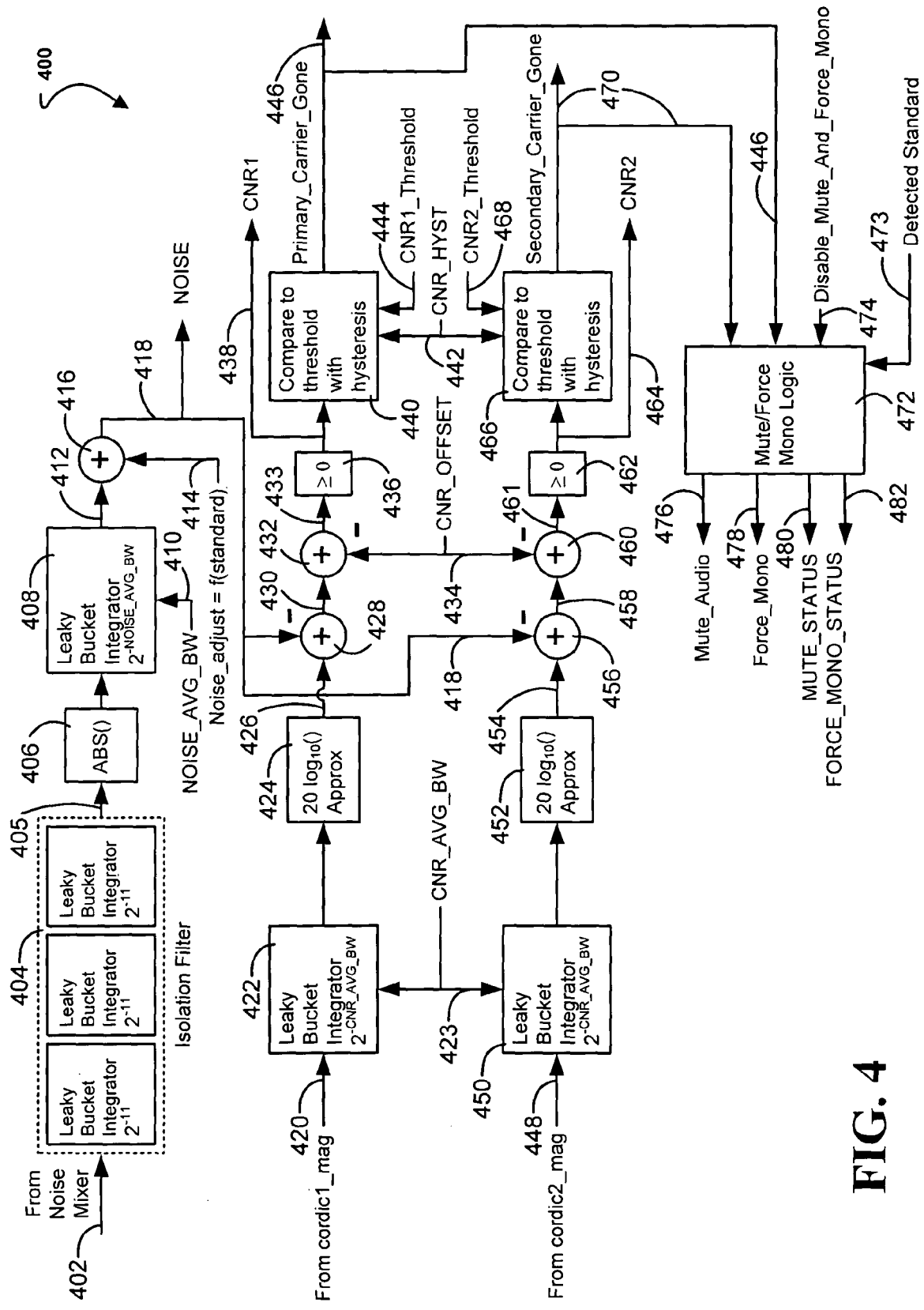
FIG. 4 is a block diagram of a particular illustrative embodiment of a system to estimate carrier noise and limit audio output based on that estimation.

Referring to FIG. 4, a particular illustrative embodiment of a system to estimate carrier noise and limit audio output based on that estimation is depicted and generally designated 400. The system 400 can include an isolation filter 404 coupled to logic 406. The isolation filter 404 may comprise three leaky bucket integrators. The logic 406 may be an absolute value calculation circuit. The logic 406 may be coupled to an averaging filter 408 which is coupled to a summation module 416. The averaging filter 408 may be a leaky bucket integrator. The summation module 416 may be logic for adding signals.

The system 400 may also include averaging filter 422 coupled to logic 424. The averaging filter 422 may be a leaky bucket integrator. The logic 424 may be a logarithmic approximation circuit. The logic 424 may be coupled to a summation module 428 that is coupled to a summation module 432. The summation module 416 may be coupled to the summation module 428. Summation modules 428 and 432 may be logic for adding signals. The summation module 432 may be coupled to logic 436. The logic 436 may be a circuit to determine if an input signal is greater than or equal to zero. The logic 436 may be coupled to logic 440 for comparing the input to a threshold with hysteresis present as part of the comparison.

The system 400 may also include averaging filter 450 coupled to logic 452. The averaging filter 450 may be a leaky bucket integrator. The logic 452 may be a logarithmic approximation circuit. The logic 452 may be coupled to a summation module 456 that is coupled to a summation module 460. The summation module 416 may be coupled to the summation module 456. Summation modules 456 and 460 may be logic for adding signals. The summation module 460 may be coupled to logic 462. The logic 462 may be a circuit to determine if an input signal is greater than or equal to zero. The logic 462 may be coupled to logic 466 for comparing the input to a threshold with hysteresis as part of that comparison.

The logic 440 and the logic 466 may be coupled to logic 472. The logic 472 may be a controller or hardware components adapted to mute an audio signal or force an audio signal to be a mono audio signal. In a particular embodiment, the system 400 may comprise the carrier mute circuit 150 shown in FIG. 1.

During operation, the system 400 can receive a noise signal 402. The noise signal 402 may be a portion of the modulated audio signal where there is not expected to be a carrier. The noise signal 402 may be determined by a tunable noise mixer, such as the tunable noise mixer 142 shown in FIG. 1. The isolation filter 404 may receive the noise signal 402 and integrate the noise signal. In a particular embodiment, the isolation filter may apply one or more low-pass filters to the noise signal. The isolation filter 404 may then provide the integrated noise signal 405 to the logic 406 that determines an absolute value of the integrated noise signal 405. The averaging filter 408 then receives the absolute value signal and integrates it based on a smoothing parameter noise estimate 410. An output signal 412 of the averaging filter 408 can then be summed at the summation module 416 with a noise adjustment value 414. The noise adjustment value 414 may be determined based on a transmission standard of the audio signal. The summation module 416 may provide an estimated noise output 418.

The integrator 422 may receive a magnitude 420 of an audio signal. The magnitude may be received from a CORDIC demodulator of a primary carrier audio signal. The averaging filter 420 then can filter the magnitude 420 based on a smoothing parameter 423. The averaging filter 420 may provide a filtered magnitude signal to the logic 424. The logic 424 may determine a logarithmic approximation of the integrated magnitude signal and provide the logarithmic approximation to the summation module 428. The summation module 428 may add a negative of the estimated noise output 418 to the logarithmic approximation to produce a first summed signal 430. The first summed signal 430 may be summed with a negative of an offset value 434 at summation node 432 to produce a second summed signal 433. The offset value 434 may be selected to allow CNR estimates to be biased to a particular range. The logic 436 may determine if the second summed signal 433 is greater than or equal to zero. The output 438 of the logic 436 may be an estimate of a carrier-to-noise ratio of the primary audio carrier signal.

In a particular embodiment, the output 438 may be input to logic 440 and compared to a threshold 444 to determine if the primary carrier can be detected in the output 438. The threshold may be based on a hysteresis 442 of the output 438. When the primary carrier can not be detected or the primary carrier is determined to be too weak, a primary carrier gone signal 446 may be activated. The primary carrier gone signal 446 may set a bit in a register to indicate that the primary carrier was not detected.

The averaging filter 450 may receive a magnitude 448 of the audio signal. The magnitude may be received from a CORDIC demodulator of a secondary carrier audio signal. The averaging filter 450 then can filter the magnitude 448 based on a smoothing parameter 423. The averaging filter 450 may provide a filtered magnitude signal to the logic 452. The logic 452 may determine a logarithmic approximation of the integrated magnitude signal and provide the logarithmic approximation to the summation module 456. The summation module 456 may add a negative of the estimated noise output 418 to the logarithmic approximation to produce a third summed signal 458. The third summed signal 458 may be summed with a negative of an offset value 434 at summation node 460 to produce a fourth summed signal 461. The logic 462 may determine if the fourth summed signal 461 is greater than or equal to zero. The output 464 of the logic 462 may be an estimate of a carrier-to-noise ratio of the secondary audio carrier signal.

In a particular embodiment, the output 464 may be input to logic 466 and compared to a threshold 468 to determine if the primary carrier can be detected in the output 438. The threshold may be based on a hysteresis 442 of the output 464. When the secondary carrier can not be detected or the secondary carrier is determined to be too weak, a secondary carrier gone signal 470 may be activated. The secondary carrier gone signal 470 may set a bit in a register to indicate that the secondary carrier is not detected or is too weak.

The primary carrier gone signal 446 and the secondary carrier gone signal 470 may be input into logic 472 to determine when to mute the audio signal or force the audio signal to be a mono audio signal. When the primary carrier gone signal 446 or the secondary carrier gone signal 470 indicates that at least one of the carrier signals is gone (i.e. detected below the threshold level), and based on a standard input 473 of a detected standard, the logic 472 may mute the audio signal by activating a mute audio output 476. Alternatively, the logic 472 may force the audio signal to be a mono audio signal by activating the force mono output 478.

The logic 472 may also provide a mute status output signal 480 that indicates when the logic 472 determines to mute the audio signal. The logic 472 may also provide a force mono status signal 482 that indicates when the logic 472 determines to force the audio signal to a mono audio signal. The logic 472 may also receive a disable input 474 that disables the logic from activating the mute signal 476 or the force mono signal 478. The mute status signal 480 and the force mono status signal 482 may still be active when the disable input 474 is activated.

Figure 5:
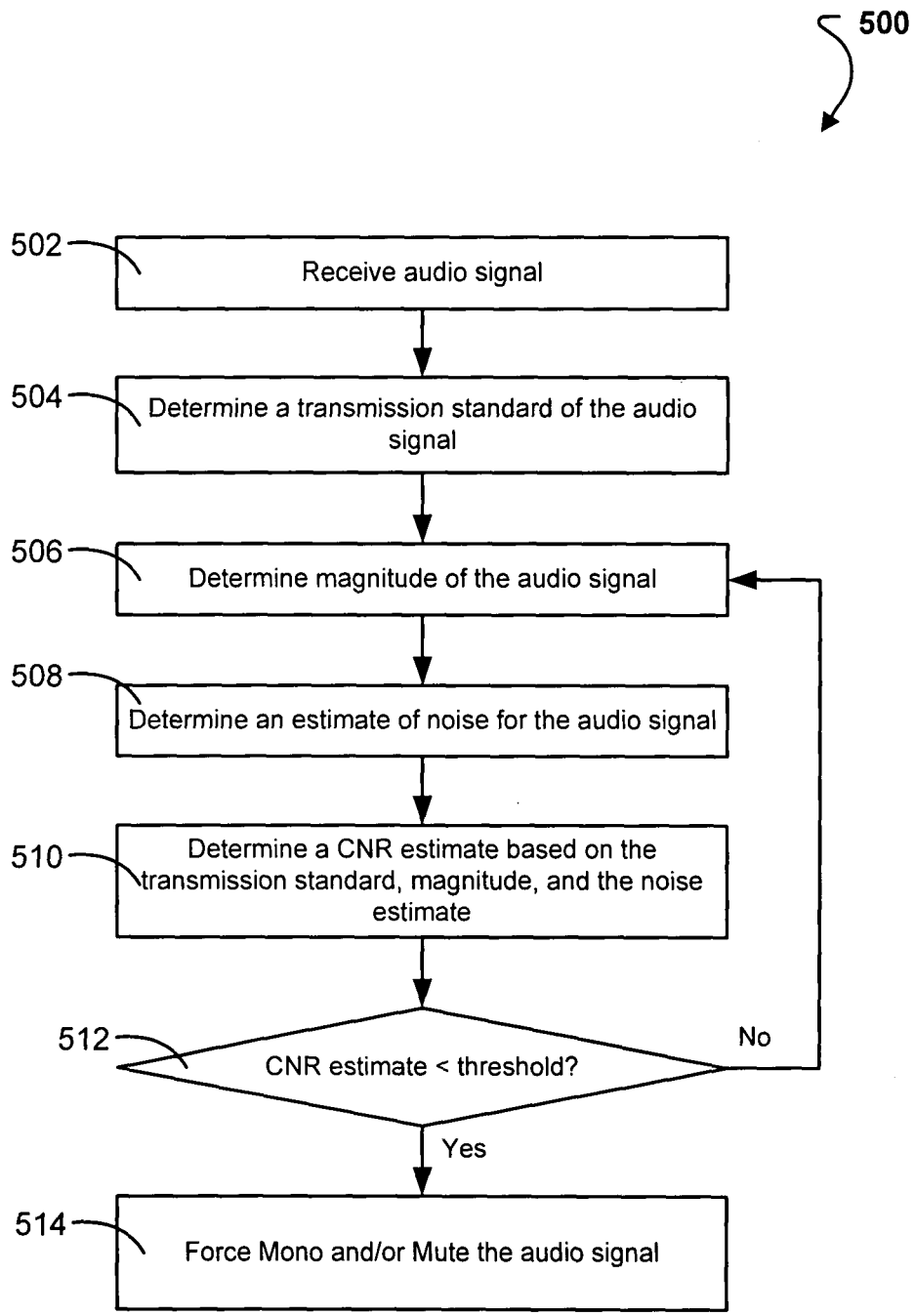
FIG. 5 is a flow chart depicting a particular illustrative embodiment of a method of limiting audio output based on a carrier noise estimate.

Referring to FIG. 5, a particular illustrative embodiment of a method of demodulating audio signals is depicted and generally designated 500. The method 500 may include receiving a modulated audio signal, at 502. The method may also include determining a transmission standard of the audio signal, at 504, and determining a first magnitude of the audio signal, at 506. The transmission standard may be based on a primary carrier frequency of the audio signal and a secondary carrier frequency of the audio signal.

The method 500 may also include determining an estimate of noise of the audio signal independent of the magnitude, at 508. The estimate of noise may be determined by measuring a second magnitude of the audio signal at a frequency that is not a carrier frequency.

The method 500 may also include determining a carrier noise estimate based on the first magnitude, the noise estimate, and the transmission standard, at 510. The carrier noise estimate may be based on a carrier-to-noise ratio or carrier plus noise to noise ratio.

The carrier noise estimate may be compared to a threshold, at 512. The threshold may be determined automatically based on a transmission standard or set manually by a controller. When the carrier noise estimate is not below the threshold, the method 500 may repeat. When the carrier noise threshold is below the threshold, the method 500 may modify the audio output, at 514. Modifying the audio output may include muting the output or forcing the audio output to provide a mono audio signal.

In a particular embodiment, the method 500 may also include determining a second magnitude of the audio signal and determining the carrier noise estimate based on the first magnitude, the second magnitude, the estimate of the noise, and the transmission standard. The first magnitude may be determined for a primary carrier frequency and the second magnitude may be determined for a secondary carrier frequency.

In another particular embodiment, the method 500 may be performed by an audio demodulator, such as the audio demodulator 100 shown in FIG. 1 or the audio demodulator 210 shown in FIG. 2. The audio demodulator may provide one or more outputs indicating at least one carrier noise estimate, an output indicating the estimate of noise not at a carrier frequency, and one or more outputs indicating when the audio output has been modified. Further, the audio demodulator may provide one or more outputs indicating when the carrier noise estimate is below a threshold.

Figure 6:
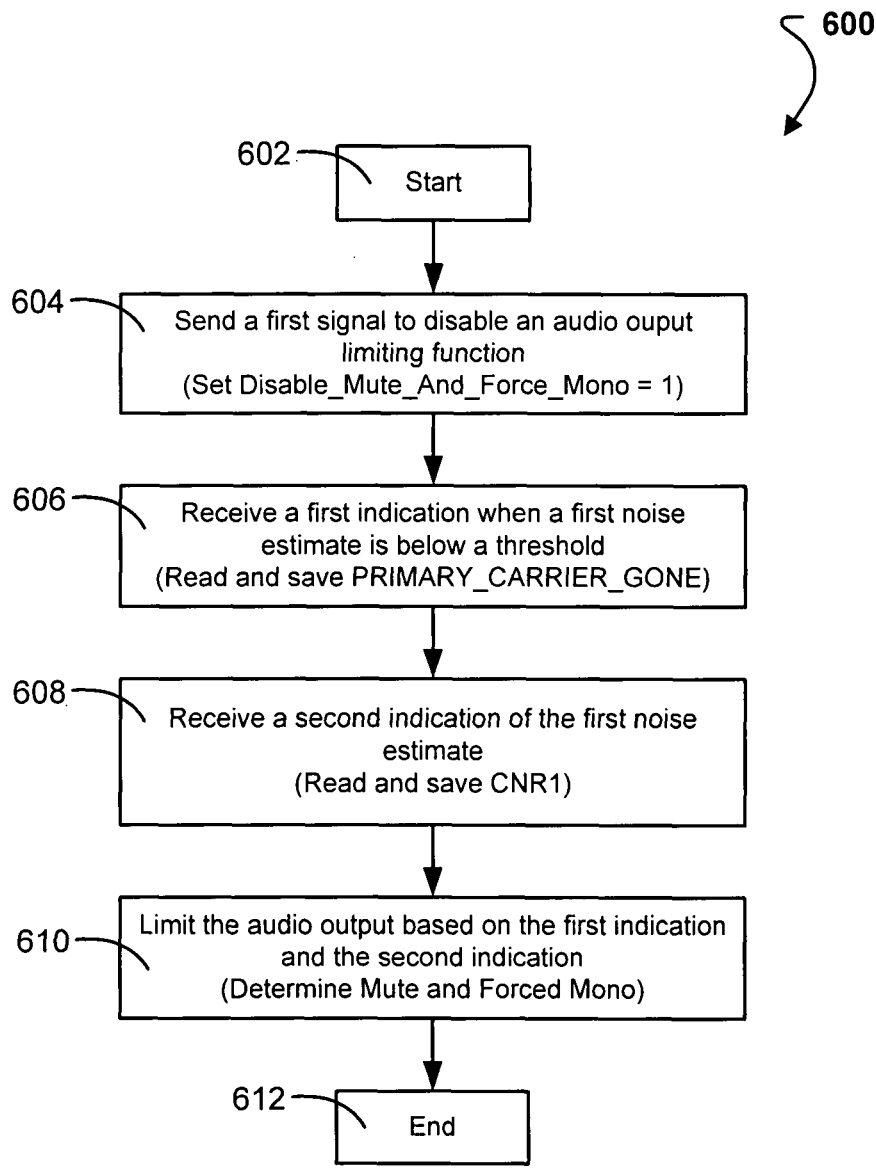
FIG. 6 is a flow chart depicting a second particular illustrative embodiment of a method of limiting audio output based on a carrier noise estimate.

Referring to FIG. 6, a second particular illustrative embodiment of a method of demodulating audio signals is depicted and generally designated 600. The method 600 may start, at 602 and may include sending a first signal to disable an audio output limiting function at an audio demodulator, at 604. The first signal may set a control line to high or set a bit in a register to a specific value, such as logic "1". The method 600 may also include receiving a first indication from the audio demodulator when a first carrier noise estimate is below a threshold, at 606. The method 600 may also include receiving a second indication from the audio demodulator of the first carrier noise estimate, at 608. The method 600 may also include limiting the audio output based on the first indication and the second indication, at 610. Limiting the audio output may include muting the audio output and/or forcing the audio output to provide a mono audio signal.

In a particular embodiment, the method 600 may include receiving a third indication from the audio demodulator when a second carrier noise estimate is below a threshold, at 606, and receiving a fourth indication from the audio demodulator of the second carrier noise estimate, at 608. The method 600 may also include limiting the audio output based on the first indication, the second indication, the third indication, and the fourth indication, at 610.

The first carrier noise estimate may be based on a primary carrier frequency and the second carrier noise estimate may be based on a secondary carrier frequency. The carrier noise estimate may be determined by a carrier signal magnitude plus noise of the carrier signal, all divided by an independent estimate of the noise of the modulated audio signal.

Figure 7:
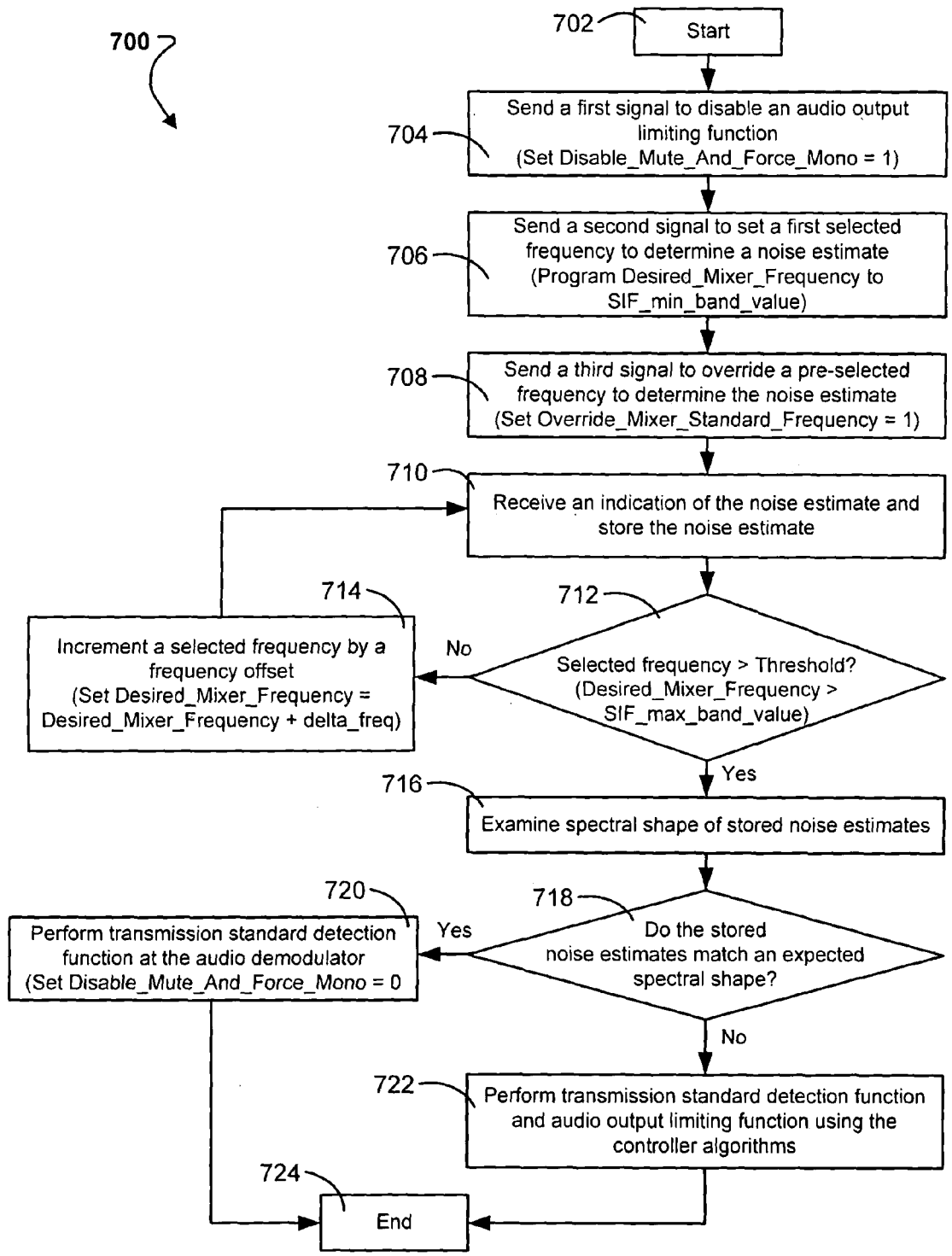
FIG. 7 is a flow chart depicting a third particular illustrative embodiment of a method of limiting audio output based on a carrier noise estimate.

Referring to FIG. 7, a third particular illustrative embodiment of a method of limiting audio output based on a carrier noise estimate is depicted and generally designated 700. The method 700 may start, at 702, and may include sending a first signal to disable an audio output limiting function at an audio demodulator, at 704. The first signal may set a control line to high or set a bit in a register to a specific value, such as "1".

The method 700 may also include sending a second signal to set a first selected frequency to determine a noise estimate, at 706. In a particular embodiment, the method 700 may set the desired mixer frequency input 144 shown in FIG. 1 to a minimum frequency in a spectrum of a modulated audio signal.

The method 700 may also include sending a third signal to override a pre-selected frequency for the noise estimate, at 708. The third signal may set a control line to high or set a bit in a register to a specific value, such as "1". In a particular embodiment, the method 700 may set the override mixer standard frequency input 146 shown in FIG. 1 to a value of "1" to initiate an override.

After the override is initiated, the method 700 may include receiving a first indication from an audio demodulator of a first noise estimate and storing the first noise estimate, at 710. The first noise estimate may be stored as a function of frequency. The first selected frequency may then be compared to a threshold frequency, at 712. The threshold frequency may be a maximum frequency allowed in the spectrum of the audio signal. When the first selected frequency is not greater than the threshold, the first selected frequency may be incremented by a frequency offset to a second selected frequency, at 714. The method 700 may then receive a second indication from the audio demodulator of a second noise estimate and store the second noise estimate, at 710. The method 700 may repeat the incrementing, the receiving the noise estimate and the storing the noise estimate until a maximum frequency in the spectrum is reached.

When the maximum frequency in the spectrum has been reached, when the selected frequency is greater than the maximum frequency allowed, at 710, the method 700 may examine the spectral shape of the stored noise estimates, at 716. The method 700 may compare the stored noise estimates to an expected spectral shape, at 718. When the stored noise estimates match the expected spectral shape, a transmission standard detection function may be performed at the audio demodulator, at 720. Also, an audio output limiting function may be performed at the audio demodulator when the stored noise estimates do match the expected spectral shape, at 720. In a particular embodiment, the audio demodulator may be the audio demodulator 210 shown in FIG. 2.

When the stored noise estimated do not match the expected spectral shape, a transmission standard detection function may be performed at a controller coupled to the audio demodulator, at 722. Also, an audio output limiting function may be performed at the controller coupled to the audio demodulator when the stored noise estimates do not match the expected spectral shape, at 722. The controller may perform the transmission standard detection function and the audio output limiting function as a function of spectral shape using an algorithm operable by the controller. The audio output limiting function may include muting an audio output signal and forcing the audio signal to be a mono audio signal. In a particular embodiment, the controller may be the controller 218 shown in FIG. 2.

While specific systems and components of systems have been shown, it should be understood that many alternatives are available for such systems and components. For example, the carrier mute circuit 150 may comprise discrete components or a controller. For another example, while the above systems, devices, and methods have been described with respect to audio signals, the above systems, devices, and methods can also be applied to video signals. In a particular embodiment, for example, the video demodulator 206 shown in FIG. 2 may implement the methods and devices described above. In another particular illustrative embodiment, for example, a system to control memory operations may include hardware, software, firmware, or any combination thereof to perform functions and methods of operation as described. It should be understood that particular embodiments may be practiced solely by a processor executing processor instructions and accessing a processor readable memory, or in combination with hardware, firmware, software, or any combination thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving a modulated signal at an input of a demodulator;
   determining a first noise estimate of the modulated signal via a tunable noise mixer;
   generating a first output indicating a first carrier noise estimate of the modulated signal at a primary carrier frequency;
   generating a second output indicating a second carrier noise estimate of the modulated signal at a secondary carrier frequency;
   determining a first magnitude of the modulated signal at the primary carrier frequency;
   determining a second magnitude of the modulated signal at the secondary carrier frequency;
   determining the first carrier noise estimate based on the first magnitude and the first noise estimate;
   determining the second carrier noise estimate based on the second magnitude and the first noise estimate; and
   modifying an output of the modulated signal based on the first noise estimate, the first carrier noise estimate, and the second carrier noise estimate.

2. The method of claim 1, wherein modifying the output further comprises implementing one of muting the output and providing a mono audio signal.

3. The method of claim 1, wherein the modulated signal is selected from an audio signal, a video signal, or a combination thereof.

4. The method of claim 1, further comprising:
   determining a transmission standard of the modulated signal; and
   determining the first noise estimate based on the transmission standard.

5. A method comprising:
   receiving a modulated signal at an input of a demodulator;
   determining a first noise estimate of the modulated signal via a tunable noise mixer;
   generating a first output indicating a first carrier noise estimate of the modulated signal at a primary carrier frequency;
   generating a second output indicating a second carrier noise estimate of the modulated signal at a secondary carrier frequency;
   generating a third output of the first noise estimate;
   generating a fourth output indicating when a forced mono state is determined;
   generating a fifth output indicating when a mute state is determined;
   generating a sixth output indicating when the primary carrier is below a primary carrier threshold; and
   generating a seventh output indicating when the secondary carrier is below a secondary carrier threshold.

6. A device comprising:
   a radio frequency front end coupled to a first input, wherein the radio frequency front end is adapted to receive a broadcast television signal and to apply a gain to the broadcast television signal to produce a modulated signal; and
   a demodulator coupled to the radio frequency front end for determining a first carrier noise estimate of the modulated signal,
   wherein the first carrier noise estimate is determined independent of the gain and independent of an indicator of signal quality of the broadcast television signal at the radio frequency front end.

7. The device of claim 6, wherein the radio frequency front end is further adapted to split the broadcast television signal into a modulated audio signal and a modulated video signal, and wherein the first carrier noise estimate is determined independent of the gain and independent of a signal quality of the modulated audio signal determined at the radio frequency front end.

8. The device of claim 6, further comprising:
   a first output;
   a second output indicating the first carrier noise estimate of the modulated signal at a primary audio carrier; and
   a third output indicating a second carrier noise estimate of the modulated signal at a secondary audio carrier,
   wherein the demodulator is adapted to provide a demodulated audio signal at the first output and selectively implement an audio output limiting function based on the first carrier noise estimate and the second carrier noise estimate.

9. The device of claim 8, further comprising:
   a controller coupled to the demodulator and adapted to:
      send a first signal to the demodulator to disable the audio output limiting function;
      receive a first indication from the demodulator of the first carrier noise estimate;
      receive a second indication from the demodulator when the first carrier noise estimate is below a first threshold; and
      selectively limit the demodulated audio signal at the first output based on the first indication and the second indication.

10. The device of claim 9, wherein the controller is further adapted to:
   receive a third indication from the demodulator of the second carrier noise estimate;
   receive a fourth indication from the demodulator when the second carrier noise estimate is below a second threshold; and selectively limit the demodulated audio signal at the first output based on the first indication, the second indication, the third indication, and the fourth indication.

11. The device of claim 6, wherein the demodulator further comprises:
    a first demodulator for determining a first magnitude of a primary audio carrier of the modulated signal;
    a second demodulator for determining a second magnitude of a secondary audio carrier of the modulated signal;
    a noise mixer for determining a noise estimate based on a transmission standard of the broadcast television signal; and
    logic coupled to the first demodulator, to the second demodulator, and to the noise mixer to determine the first carrier noise estimate based on the first magnitude and the noise estimate, and to determine a second carrier noise estimate based on the second magnitude and the noise estimate.

12. A method comprising:
    sending, from a controller to an audio demodulator, a first signal to disable an audio output limiting function in the audio demodulator;
    receiving, at the controller, a first indication from the audio demodulator when a first carrier noise estimate of a modulated audio signal is below a threshold;
    receiving, at the controller, a second indication from the audio demodulator of the first carrier noise estimate; and
    selectively limiting the audio output based on the first indication and the second indication.

13. The method of claim 12, wherein the first carrier noise estimate is based on a primary carrier frequency.

14. The method of claim 12, further comprising receiving, at the controller, a third indication of a first noise estimate from the audio demodulator, wherein the first noise estimate is based on a magnitude of the modulated audio signal at a frequency that is not a carrier frequency.

15. The method of claim 14, further comprising:
    receiving, at the controller, a fourth indication from the audio demodulator when a second carrier noise estimate of a modulated audio signal is below a threshold; and
    receiving, at the controller, a fifth indication from the audio demodulator of the second carrier noise estimate.

16. A method comprising:
    sending, from a controller to a noise mixer, a first signal to selectively tune the noise mixer to multiple frequencies in a frequency spectrum of a modulated signal;
    receiving, at the controller, an indication of signal energy from a demodulator at each of the multiple frequencies to which the noise mixer is selectively tuned;
    determining an indicator of spectral content of the modulated signal as a function of frequency based on the indication of signal energy; and
    selectively limiting an output based on the indicator of spectral content.

17. The method of claim 16, further comprising:
    sending, from the controller to the demodulator, a second signal to disable an audio output limiting function in the demodulator; and
    sending, from the controller to the noise mixer, a third signal to override a pre-selected frequency of the noise mixer, wherein the pre-selected frequency is based on a broadcast standard.

18. The method of claim 17, further comprising performing an audio output limiting function and performing a broadcast standard transmission function at the controller when the indicator of spectral content does not match an expected spectral shape.

* * * * *